March 31, 1970  R. C. BAKER  3,503,258

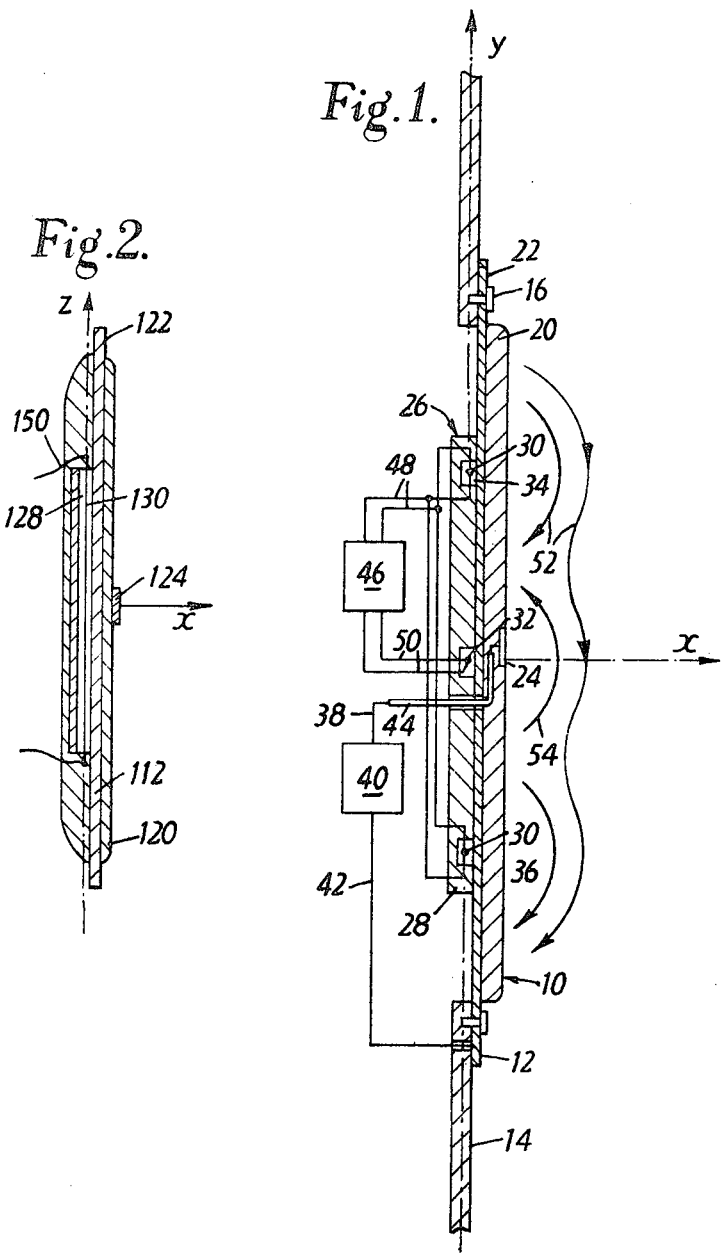

FLUID FLOW VELOCITY MEASUREMENT

Filed Feb. 5, 1968  2 Sheets-Sheet 2

INVENTOR
ROGER CECIL BAKER
BY Young + Thompson
ATTYS.

United States Patent Office 3,503,258
Patented Mar. 31, 1970

3,503,258
FLUID FLOW VELOCITY MEASUREMENT
Roger Cecil Baker, Cambridge, England, assignor to George Kent Limited, London, England, a British company
Filed Feb. 5, 1968, Ser. No. 703,083
Claims priority, application Great Britain, Feb. 9, 1967, 6,333/67; Feb. 22, 1967, 8,557/67
Int. Cl. G01p *5/08*
U.S. Cl. 73—194                20 Claims

ABSTRACT OF THE DISCLOSURE

In the electromagnetic measurement of the flow velocity of electrically conductive fluids, the effects of disturbances in the boundary layers in the fluid adjacent the measuring apparatus are offset by a reversal in the direction of the effective magnetic field so that the electric potential sensed by the apparatus is due primarily to the fluid flow remote from the apparatus, the flow adjacent the device producing opposed potentials which cancel out. By altering the distance from the apparatus at which the field reverses, the portion of the fluid flow contributing the potential sensed can be changed. The apparatus can be suitable for static and marine applications. It may have two electrodes preferably so positioned in the field as to sense potentials of opposed sense or one electrode in the field and a second outside; such a second electrode can comprise the exposed periphery of an electrostatic screen between the electrode and the means for producing the magnetic field.

---

The invention relates to the measurement of the velocity of a flowing fluid, and more specifically, to the measurement of the flow velocity of an electrically conductive fluid by electromagnetic means.

When an electrically conductive fluid flows across a magnetic field, an electric potential dependent on the flow velocity, is produced in the fluid. By sensing and suitably treating this potential, a signal indicative of the flow velocity, that is, of the speed or relative movement of the fluid and the magnetic field, can be obtained. The means for sensing such potentials must necessarily be in contact with the fluid and must therefore constitute a boundary for the fluid. Measurements based on the sensed potentials will consequently be subject to errors due to boundary effects.

The invention has as its objects the provision of improved method and means for sensing such potentials for the purpose of measuring the speed of flow. More specifically, the invention has as its objects to provide a method and a device for electromagnetic measurement of fluid flow velocity in which boundary layer effects are reduced or eliminated.

The invention accordingly provides a device for measuring the speed of flow of an electrically conductive fluid, the device comprising means for producing a magnetic field having a component in the fluid at right angles to the direction of flow, and electrode means including at least one electrode for sensing the resulting electric potential in the fluid, the magnetic field component reversing its direction adjacent the one electrode, whereby at least the major part of the potential sensed thereby is due to flowing fluid remote from the device.

The invention also provides a method of measuring the speed of flow of an electrically conductive fluid, the method having the steps of producing in the fluid a magnetic field, the field having a component perpendicular to the direction of flow which reverses its direction adjacent the device, and sensing the electric potential within the field, at least a major part of the potential sensed being due to that of fluid in a region beyond the reversal position.

It will be understood that the invention provides for reversal of the magnetic field near the surface of the potential sensing device in contact with the fluid, so that contribution to the sensed potential of the fluid in the boundary layer is in the two parts which are opposed but of unequal magnitude, so that the potential sensed is due to fluid outside the boundary layer. By increasing the physical size of the device, the extent to which the boundary layer effects in the two parts of the field cancel out can be increased indefinitely.

By way of example only, embodiments of the invention are described below with reference to the accompanying drawings, in which:

FIGURE 1 is a schematic sectional view of a marine wall velometer device according to the invention;

FIGURE 2 is a schematic sectional view of a similar device suited for stationary use;

Figure 3:
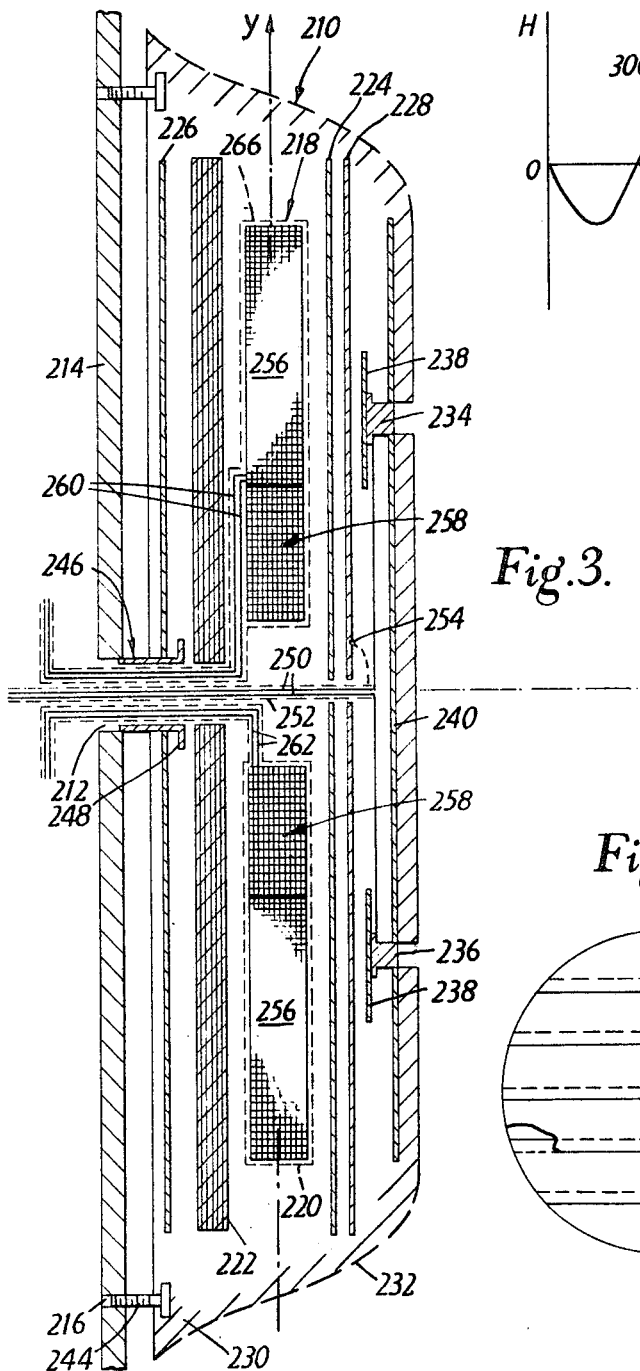
FIGURE 3 is a schematic exploded sectional view of a further velometer device embodying the invention.

The wall velometer device 10 shown in FIGURE 1 comprises a thin plate 12 of magnetically non-permeable (non-magnetic) metal mounted externally of a ship's side wall 14 over an aperture therein at a position below water level. The plate 12 is secured in placed by any suitable means shown here as bolts 16 extending through apertures in the periphery of the plate into tapped holes in the wall 14.

The plate 12 has a layer 20 of insulating material, conveniently a plastics material, bonded on its outer facing side. The plate 12 has to be at the electric potential of the water outside the immediate vicinity of the device and the layer 20 therefore does not cover the entire surface but leaves a peripheral zone 22 exposed. Where the wall 14 has a metal surface in electrical contact with the water, the plate 12 can be electrically connected to this surface by the securing means or in any other suitable way and the layer 20 can then cover the whole surface of the plate. Embedded centrally within the layer 20 is an electrode 24 in the form of a metal disc. The electrode has its outer surface exposed for contact with the water.

On the inner side of the plate 12 is mounted a means 26 for creating a magnetic field in the area immediately adjacent the outer side of the plate. The magnetic field creating means comprises a core 28 of soft iron or other magnetically permeable material having a pair of outer windings or conductors 30 and a single inner winding or conductor 32 associated therewith by being received in respective parallel slots 34 in the surface of the core engaging the plate 12. The conductors 30, 32 are sealed in the slots by insulating, for example, plastics, material 36. The portions of the windings shown extend in the direction of fluid flow, which can be regarded as outwardly of the plane of FIGURE 1 at right angles to this plane or in the direction of the 3 axes associated with the $x$ and $y$ axes shown in the figure.

A lead 38 is connected at its outer end to the electrode 24 and extends inwardly of the ship's wall 14 through aligned apertures in the plate 12 and the core 28 to electric circuit means shown schematically at 40. The circuit means 40 is connected also to the peripheral portion 22 of the plate 12 by a lead 42 and is responsive to the difference in the potential sensed by the electrode 24 in the magnetic field and by the portion 22, which is effectively outside it, to provide a signal which depends on this potential difference and indicates the speed of relative movement of the device and the water, due to movement of the ship. The portion of the lead 38 in the vicinity of the magnetic field producing means 26 is screened by an earthed screen 44, the end of the lead and the screen being embedded in the layer 20. To minimise circuit loops which could link with the magnetic field and give rise to spurious voltages, the electrode 24 is placed as near as possible to the plate 12.

In operation, electric current is made to flow in a first direction in the outer conductors 30 and in the reverse direction in the conductor 32. The current is obtained from a source 46 and is supplied to the conductors 30 by leads 48 and to the conductor 32 by leads 50. The current in the outer conductors 30 gives rise to a magnetic field, indicated by lines 52, in the water on the outer side of the velometer, the strength of which is increased by the core 28. The current in the conductor 32 similarly gives rise to a field of like shape but of contrary sense indicated by line 54. The plate 12 is sufficiently thin to cause no substantial weakening of the magnetic fields due to eddy currents within it. The relative movement of the ship and the water is in a direction at right angles to the plane of the figure corresponding to the $z$ axis associated with the $x$ and $y$ axes marked on FIGURE 1, so that both magnetic fields have components at right angles to this direction, that is, along the $y$ axis. It will be noted that the magnetic field on a line extending outwardly from the centre of the electrode 24 normal to the plate 26, along the $x$ axis, undergoes a reversal of direction at a position near to the electrode dependent on the relative strength of the two magnetic fields.

Because of the flow of the water relative to the ships side through the magnetic field, an electric potential is generated in the water which is sensed by the electrode 24 relative to the potential of the water effectively outside the field, which is sensed by the plate portion 22.

The velometer device of FIGURE 1 makes use of the fact that the electric potential generated at a point on a surface past which the fluid is flowing can be expressed as the integral, along a line through the point and normal to the surface, of the magnetic field component parallel to the surface and perpendicular to the direction of flow multiplied by the flow component parallel to the surface at half the distance from the surface along the line. This result is independent of the shape and size of the magnetic field for electrolytic conductors and approximately so for highly conductive fluids, that is, for fluids with conductivities approaching those of metals. Expressed mathematically, the potential is given by the equation $$U(y;z) = \int_0^\infty V_z\left(\frac{x}{2}\right) B_y(x;y;z) dx$$

where $y$ and $z$ are co-ordinates giving the position of the electrode on the surface, $V_z$ is the velocity distribution as a function of $x$ and $B_y$ is the magnetic field in the $y$ direction.

Because the magnetic field reverses at a position on the $x$-axis near the electrode, the potential sensed is almost entirely due to the potential generated at some distance from the device and is therefore free or substantially free of boundary layer effects. The error can be reduced by increasing the size of the device.

It will be understood that what is measured is the relative speed of movement of the fluid and the device. The device of FIGURE 1 could therefore be used to measure not the speed through water of a ship on which it is mounted but the flow velocity of a conductive liquid in a conduit or open channel in which the device is secured. For such aplications, the essential elements of the device of FIGURE 1 can be enclosed within a housing as shown in FIGURE 2. Here, the plate 112 and the core 128 with its associated conductors, of which one only, indicated by reference numeral 130, is shown, are enclosed in a case 120 of plastics material and streamlined shape. The case provides the necessary electrical insulation between the plate 112 and an electrode 124. An edge portion of the plate 122 outside the magnetic field produced by the device projects outwardly of the case for contact with a liquid in which the device can be immersed. Leads, of which only leads 150 to the conductor 132 are shown extend through the case to a current supply source and suitable circuit arrangements for producing the desired signal.

In use the device of FIGURE 2 is clamped within a pipe or positioned in any other suitable way in a flowing fluid, so that the flow direction is along the $z$ axis shown. The orientation of the marked axes corresponds to that of FIGURE 1. The operation of the device essentially resembles that of FIGURE 1 and it will be evident that the FIGURE 2 device can be flush mounted on the hull of a vessel.

A particularly advantageous feature of either of the devices of FIGURES 1 and 2 when used in a pipe is that by adjustment of the relative strengths of the magnetic fields due to the inner and outer conductors, the effective region over which the potential sensed by the electrode 24, 124 is integrated can be moved along the $x$ axis. It is for this reason that independent current supply leads for the inner and outer conductors have been shown; the supply source 40 includes means for selective adjustment of the two currents supplied. This feature of the invention is of particular value where it is desired to investigate the flow distribution across a pipe, for example.

The wall velometer 210 illustrated in FIGURE 3 is intended primarily for marine applications. The device is arranged to be mounted externally of a ship's side wall 214 at a position below water level. Instead of the single relatively large diameter aperture needed for mounting the FIGURE 1 device, the device of FIGURE 3 requires the formation in the ship side wall only of a plurality of small holes 216 for receiving the shanks of fixing bolts and a central hole 212 for the reception of connecting leads. The device of FIGURE 3 can thus be more readily and conveniently mounted than the device of FIGURE 1.

The present velometer device resembles that of FIGURE 1 in including magnetic field producing means separated by an electrostatic shield from electrode means for contacting the water through which the ship is moving.

The field producing means comprises an annular coil assembly 218 surrounded by a shield element 220 which prevents electrostatic effects due to the assembly from affecting the potentials sensed by the electrode means. The coil assembly 218 is backed by a laminated magnetic core 222 which is also annular in that its outer edge corresponds to that of the coil assembly and its centre is apertured. The core and the coil assembly are sandwiched between a pair of centrally apertured insulating discs 224 and 226, the latter serving primarily to strengthen the device. An electrostatic screen 228 lies against the insulating disc 224 which is on the outer side in use. The other disc 226 constitutes the innermost component of the device, except for a casing 230 of insulating material, for example, a moulded plastics material such as "Araldite."

FIGURE 3 is an exploded view and it will be understood that the rear surface of the casing 230 will in use abut against the outer surface of the side wall 214. The various components of the device will be relatively moved axially in practice so that adjacent components engage. The casing is preferably moulded about the engaging components under conditions of pressure and flow such that gaps between the components are filled by the moulding material before this sets. The peripheral edge 232 of the casing is preferably shaped as shown so that the device has the form of a smooth raised area on the ship's wall and presents negligible resistance to movement.

On the outer side of the electrostatic screen 228 two electrodes 234, 236 mounted, each being electrically insulated from the screen by an associated insulating disc 238, for example, of mica. Overlying the electrodes and insulating discs and engaging the former to hold them in place, is a cover plate 240 of suitable insulating material, for example, glass fibre. The plate has a pair of apertures 242 through which the outer end surfaces of the electrodes can make electrical contact with the water. The plate serves as a reinforcement for the whole structure. Except for the apertures for the electrodes, the plastics casing 230 extends entirely over the plate 240 and the casing outer surface is preferably flush with the exposed end surfaces of the electrodes. Securing bolts 244 are embedded in the rear panel of the plastics casing 230, with their shanks protruding for reception through the holes 216 and into nuts on the inner side of the wall 214 for fixing the device in place. The leads to the electrodes 234, 236 and to the coil assembly 218 are conveyed through the central hole 212 in the wall in a bushing 246 having a main sleeve portion received through this central hole and an inner flange 248 portion sandwiched between the insulating disc 226 and the laminated magnetic core 222.

The bushing 246 can be of metal, for example, brass and is then electrically insulated from the other components of the device. In a modification, the projecting end of the bushing is externally threaded and is arranged to extend beyond the inner side of the wall 214. A nut received on this projecting end is sufficient to secure the device in place, the bolts 244 and the holes 216 being then unnecessary. The leads 250 to the electrodes are enclosed in a shielding element 252 shown schematically by a broken line. The element 252 is connected to the screen 228 at 254.

The coil assembly illustrated is constructed of two annular coils 256 and 258 each wound continuously and in a single direction. The inner diameter of the coil 256 corresponds to the outer diameter of the coil 258 and the two coils are arranged coaxially in a common plane. Current is supplied to the outer coil 256 through leads 260 and to the inner coil 258 through leads 262. The currents in the two coils are obtained from a source (not shown) corresponding to the source 46 of FIGURE 1, the directions in which they flow being opposed and the current values being such that the magnetic field intensities due to the coil 256, 258 are unequal. The coil assembly and the associated leads 260 and 264 are enclosed by a shielding element 266. To prevent inter-action, between the coil assembly and the electrodes, the shielding element 252 and the shielding element 266 are connected at different points in the earthing system of the associated circuit arrangements.

Figure 4:
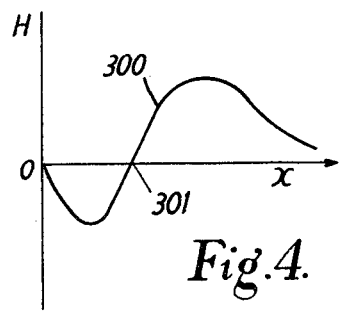
FIGURE 4 shows the magnetic field distribution of the device of FIGURE 3.

The resultant magnetic field created by the flow current through the two coils 256 and 258 is indicated generally in FIG. 4, the line 300 of which shows the variation along the $x$ axis marked on FIGURE 3, which corresponds to the axis of the coil assembly, of the intensity H of the magnetic field component in the direction of the $y$ axis. The co-ordinate system shown corresponds to that of FIGURES 1 and 2, the flow direction being along the $z$ axis. It will be seen that the field undergoes a reversal in direction at a point 301.

The magnetic field indicated in the FIGURE 4 is typical of the field along lines parallel to the $x$ axis within the effective area of the coil assembly and consequently the field in this direction through each of the electrodes 234, 236 will reverse its direction at a position near the velometer. Consequently, each of the electrodes is so positioned with respect to the coil assembly that the potential it senses is due primarily to that generated in the water at a position remote from the device, due to the field reversal in the boundary layers adjacent the device. Moreover, because the electrodes are equally spaced from the coil axis, they produce outputs which are equal and opposite. The outputs can be combined accordingly to afford a potential which is twice what would be obtained from a single electrode on the coil assembly axis with respect to the potential of water outside the magnetic field.

It will be understood that a suitable magnetic field pattern can be obtained by a variety of coil arrangements. The arrangement illustrated provides for adjustment of the reversal position 301, by changes in the separate current supplies to the two coils 256, 258, but where this facility is not required, the coil assembly can be formed from a single conductor wound in a first direction and then in the reverse direction. Such a single wound coil can comprise spaced inner and outer annular portions wound in the same sense with inner and outer spaced portions of lesser radial extent and wound in the opposite sense between them. By selecting appropriate coil assembly arrangements any suitable field pattern can be obtained in place of that shown in FIGURE 4.

Figure 5:
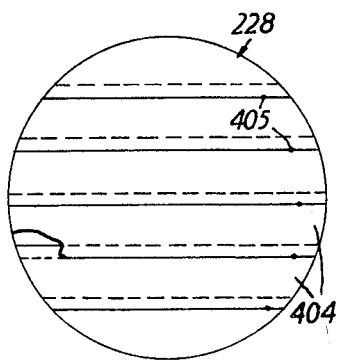
FIGURE 5 is a front view of a component of the velometer device of FIGURE 3.

A preferred, but not essential structure for the electrostatic screen 228 is shown in FIGURE 5. The illustrated screen consists of a plurality of thin metal strips 404, preferably of copper, the edge of each layer overlying but being insulated from that of the adjacent strip, as by a strip of insulating material. Electrical connection is made by a solder spot or a spot weld at the positions 405 indicated. As will be evident, circulating eddy currents within the screen are effectively eliminated over most of its area by this construction. A screen of this structure can be used in place of the thin plates 22 and 122 in the velometer devices of FIGURES 1 and 2 respectively, provided the former device is modified so that the screen 22 is relieved of its structural function.

The circuit arrangemnts for providing the current or currents to the magnetic field producing means, and for receiving the potentials sensed by the electrodes can be of any suitable kind; the later for example can be as described by I. C. Hutcheon in Electronics Letters of December 1966, vol. 2, No. 12 at p. 462.

The invention thus provides a velometer device having many advantageous features, particularly but not exclusively for marine applications, where it can readily be mounted so as not to be exposed to damage. As there are no moving parts, the device can be relied upon for long service without maintenance.

I claim:

1. A device for measuring the speed of flow of an electrically conductive fluid relative to the device, the device comprising casing means, first and second conductor means in said casing, electric current source means for causing current to flow in said first and second conductor means to produce respectively first and second magnetic fields in the fluid, the first and second magnetic fields each having a component at right angles to the direction of said fluid flow such that the resultant magnetic field component due to said first and second magnetic field components reverses in sense at a position in the fluid spaced from the device, and electrode means carried externally by said casing means for sensing electric potential in said fluid due to said first and second magnetic field components, whereby the resultant electric potential sensed by the electrode means is due to fluid flow remote from the device.

2. A device as claimed in claim 1, the electrode means comprising a first electrode and a second electrode located in contact with the fluid respectively inside and outside the magnetic fields.

3. A device as claimed in claim 2, and an electrostatic screen between the first electrode and the first and second conductor means, the second electrode being constituted by a portion of the screen extending beyond the magnetic field.

4. A device as claimed in claim 3, and means for securing the device in an aperture in the side wall of a ship, said securing means being at the periphery of the electrostatic screen.

5. A device as claimed in claim 1, and a non-magnetic electrostatic screen between the electrode means and the first and second conductor means.

6. A device as claimed in claim 5, the electrostatic screen comprising a plurality of parallel metal strips having adjacent edges overlapping each other and electrically insulating material therebetween.

7. A device as claimed in claim 1, the first conductor means comprising a pair of conductors, the pair of conductors being positioned one on either side of the second conductor means and extending parallel to the second conductor means and to the direction of fluid flow.

8. A device as claimed in claim 1, and means for selectively varying the currents flowing in the first and the second conductor means.

9. A device as claimed in claim 1, and a magnetically permeable core associated with the first and second conductor means.

10. A device as claimed in claim 1, the first conductor means comprising a first annular coil means and the second conductor means comprising a second annular coil means, the first and second coil means being coaxial.

11. A device as claimed in claim 10, the electrode means comprising first and second electrodes positioned at equal radial distances from the common axis of the first and second coil means, whereby the resultant magnetic field component sensed by the first electrode reverses its sense in the direction opposite to that in which the resultant magnetic field component sensed by the second electrode reverses its sense.

12. A device as claimed in claim 11, the first and second annular coil means forming a coplanar annular coil assembly, a magnetically permeable core backing said assembly, an electrostatic screen at the front of said assembly, insulating means overlying the screen at positions on a diameter of the coil assembly and between the inner and outer diameters thereof, the first and second electrodes being mounted on said insulating means.

13. A device as claimed in claim 12, the insulating means, the screen and the core having central apertures therein, leads to the coil assembly and to the electrodes extending through said apertures.

14. A device as claimed in claim 13, and a bushing projecting from a side of the casing opposite to that on which the electrodes are exposed, and an external thread on the bushing to permit mounting of the device on a plate apertured to receive the bushing therethrough, the leads extending through said bushing.

15. A device as claimed in claim 14, the casing being a molded plastic casing.

16. A device as claimed in claim 10, the first annular coil means comprising spaced inner and outer coils and the second annular coil means comprising spaced inner and outer coils located between the coils of the first annular coil means, no one coil of the second annular coil means having a greater radial extent than a coil of the first annular coil means.

17. A method of measuring the speed of flow of an electrically conductive fluid, comprising the steps of producing in the fluid first and second magnetic fields, the magnetic fields each having a component perpendicular to the direction of flow, the sense of the resultant magnetic field component due to said first and second components reversing at a position in the fluid spaced from the device, and sensing the electric potential generated in the fluid due to said resultant component by electrode means in contact with the fluid whereby said electric potential sensed is due to fluid flow remote from said electrode means.

18. A method as claimed in claim 17, and effecting reversal of the sense of the resultant magnetic field component at a position in the fluid spaced from a first electrode of the electrode means on a line at right angles to the direction of flow and to the magnetic field component, the potential sensed being relative to that of a second electrode in electric contact with the fluid outside the magnetic field.

19. A method as claimed in claim 18, and moving the position at which the magnetic field reverses in sense along a line at right angles to the direction of fluid flow and to the resultant magnetic field component, thereby varying the distance from the electrode means of the fluid flow responsible for the electric potential sensed.

20. A method as claimed in claim 17, and effecting reversal of the sense of the resultant magnetic field component in opposed directions at two positions in the fluid spaced from first and second electrodes of the electrode means, respectively on lines at right angles to the direction of flow and to the magnetic field component.

References Cited

UNITED STATES PATENTS

| | | |
|---|---|---|
| 1,249,530 | 12/1917 | Smith et al. |
| 3,119,960 | 1/1964 | Kenyon _____ 73—181 XR |
| 3,308,659 | 3/1967 | Herndon _____ 73—194 |
| 3,372,589 | 3/1968 | Mannherz _____ 73—194 |

CHARLES A. RUEHL, Primary Examiner

U.S. Cl. X.R.

73—181